US011984108B2

(12) United States Patent
J

(10) Patent No.: US 11,984,108 B2
(45) Date of Patent: May 14, 2024

(54) METHOD AND SYSTEM FOR NOISE CANCELLATION

(71) Applicant: L&T TECHNOLOGY SERVICES LIMITED, Chennai (IN)

(72) Inventor: Dennis J, Bangalore (IN)

(73) Assignee: L&T TECHNOLOGY SERVICES LIMITED, Tamil Nadu (IN)

( * ) Notice: Subject to any disclaimer, the term of this patent is extended or adjusted under 35 U.S.C. 154(b) by 43 days.

(21) Appl. No.: 17/708,614

(22) Filed: Mar. 30, 2022

(65) Prior Publication Data

US 2023/0298557 A1 Sep. 21, 2023

(30) Foreign Application Priority Data

Mar. 15, 2022 (IN) ............................ 202241014139

(51) Int. Cl.

*G10K 11/16* (2006.01)
*G10K 11/178* (2006.01)
*H04R 3/12* (2006.01)

(52) U.S. Cl.

CPC .... *G10K 11/1781* (2018.01); *G10K 11/17881* (2018.01); *H04R 3/12* (2013.01); *G10K 2210/3045* (2013.01); *G10K 2210/3226* (2013.01)

(58) Field of Classification Search

CPC ......... G10K 11/1781; G10K 11/17881; G10K 2210/3045; G10K 2210/3226; H04R 3/12
USPC ............................................... 381/71.1, 71.5
See application file for complete search history.

(56) References Cited

U.S. PATENT DOCUMENTS

| | | | | |
|---|---|---|---|---|
| 8,615,328 | B2 | 12/2013 | Tan | |
| 8,737,634 | B2 | 5/2014 | Brown | |
| 8,855,329 | B2 | 10/2014 | Slapak | |
| 2010/0028134 | A1* | 2/2010 | Slapak | G10K 11/17853 415/119 |
| 2013/0083939 | A1* | 4/2013 | Fellers | G10K 11/002 381/71.11 |
| 2023/0197048 | A1* | 6/2023 | Farahanisamani | B64D 33/06 381/71.4 |

* cited by examiner

*Primary Examiner* — Ammar T Hamid

(57) ABSTRACT

A method and system for noise cancellation is disclosed. In one embodiment, the method may include receiving, from a first sensor, a first signal indicative of a noise generated by an equipment. The first sensor may be configured to generate the first signal indicative of the noise generated by the equipment. The first sensor may be positioned in proximity to the equipment. The method may further include generating a noise cancellation signal based on the first signal and triggering a speaker to generate a sound corresponding to the noise cancellation signal, wherein the speaker is positioned in proximity to the equipment.

15 Claims, 7 Drawing Sheets

METHOD AND SYSTEM FOR NOISE CANCELLATION

TECHNICAL FIELD

This disclosure relates generally to noise cancellation, and more particularly to a method and system for efficiently removing noise by generating noise cancellation signals.

BACKGROUND

Acoustic noise issues have become more serious as the use of industrial equipment such as engines, blowers, fans, transformers, turbines, and compressors has increased. The traditional acoustic noise reduction techniques generally rely on passive noise control techniques such as earplugs, ear protectors, sound insulation walls, mufflers, and sound-absorbing materials. The passive noise control techniques are effective across a wide frequency range, however, necessitate relatively large and expensive materials and are ineffective at low frequencies. Active noise control/cancellation is a sound cancellation technique that detects an unwanted sound and creates a negative copy of it (anti-sound). The anti-sound is a signal with the same frequency and amplitude as the unwanted sound or noise that was detected but with the opposite polarity. The unwanted sound and the opposite polarity sound cancel each other, resulting in a significant reduction in noise. The active noise control techniques are effective at attenuating low-frequency noise in environments where passive noise control techniques may prove expensive, bulky, and ineffective.

However, the conventional active noise control techniques may not be effective at noise control/cancelling unless the (opposite polarity) sound generation is highly optimized. Further, it is desirable to determine an effectiveness of the implementation of the sound control processes and further fine tune the sound control processes for efficient noise cancellation.

SUMMARY OF THE INVENTION

In an embodiment, a noise-cancellation system is disclosed. The noise-cancellation system may include a first sensor positioned in proximity to an equipment. The first sensor may be configured to detect noise generated by the equipment and generate a first signal indicative of the noise generated by the equipment. The noise-cancellation system may further include a speaker positioned in proximity to the equipment. The noise-cancellation system may further include a processor communicatively coupled to the first sensor and the speaker and a memory communicatively coupled to the processor. The memory stores processor-executable instructions which, on execution by the processor, cause the processor to receive, from the first sensor, the first signal, generate a noise cancellation signal based on the first signal, and trigger the speaker to generate a sound corresponding to the noise cancellation signal.

In an embodiment, another noise cancellation system is disclosed. The noise cancellation system may include a cooling device which may include a plurality of sensors configured to detect noise generated by one or more noise generating sources. The cooling device may further include a plurality of speakers and a noise cancellation device communicatively coupled to the plurality of sensors and the plurality of speakers. The noise cancellation device may include a processor and a memory communicatively coupled to the processor. The memory stores processor-executable instructions which, on execution by the processor, cause the processor to receive a plurality of responses from the plurality of sensors, respectively, wherein at least one response of the plurality of responses comprises a sensor data item related to the noise, generate a noise cancellation signal based on the sensor data item related to the noise, and trigger the plurality of speakers to generate sound corresponding to the noise cancellation signal.

In an embodiment, a method of noise-cancellation is disclosed. The method may include receiving, from a first sensor, a first signal indicative of a noise generated by an equipment. The first sensor may be configured to generate the first signal indicative of the noise generated by the equipment. The first sensor may be positioned in proximity to the equipment. The method may further include generating a noise cancellation signal based on the first signal and trigger a speaker to generate a sound corresponding to the noise cancellation signal. The speaker may be positioned in proximity to the equipment.

In another embodiment, a cooling device is disclosed. The cooling device may include a plurality of sensors positioned in proximity to an equipment. The plurality of sensors may be configured to detect noise generated by the equipment. The cooling device may further include a plurality of speakers positioned in proximity to the equipment. The cooling device may further include a processor communicatively coupled to the plurality of sensors and the plurality of speakers and a memory communicatively coupled to the processor. The memory stores processor-executable instructions which, on execution by the processor, cause the processor to receive a plurality of responses from the plurality of sensors, respectively. At least one response of the plurality of responses may include a sensor data item related to the noise. The processor-executable instructions, on execution by the processor, may further cause the processor to generate a noise cancellation signal based on the sensor data item related to the noise and trigger the plurality of speakers to generate a sound corresponding to the noise cancellation signal.

In yet another embodiment, a noise-cancellation system is disclosed. The noise-cancellation system may include a plurality of sensors including a first set of sensors positioned in proximity to an equipment. The first set of sensors may be configured to detect noise generated by the equipment. The plurality of sensors may further include a second set of sensors positioned at respective locations distributed in a space defined by an enclosure. Each sensor of the second set of sensors may be configured to detect noise at its respective location. The noise-cancellation system may further include a plurality of speakers including a first set of speakers positioned in proximity to the equipment and a second set of speakers positioned at respective locations distributed in the space defined by the enclosure. The noise-cancellation system may further include a processor communicatively coupled to the plurality of sensors and the plurality of speakers and a memory communicatively coupled to the processor. The memory stores processor-executable instructions which, on execution by the processor, cause the processor to receive a plurality of responses from the plurality of sensors, respectively. At least one response of the plurality of responses may include a sensor data item related to the noise. The processor-executable instructions, on execution by the processor, further cause the processor to generate a noise cancellation signal based on the sensor data item related to the noise and trigger the plurality of speakers to generate a sound corresponding to the noise cancellation signal, based on the respective location of each of the plurality of speakers.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF THE DRAWINGS

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed.

Users are exposed to noise in different environments, for example, their workplace (e.g. data centers or server rooms, factories with heavy machinery operations like grinding, drilling, cutting, etc.) or their home (e.g., kitchen with equipment like mixers, food processor, etc.). Such noise can hamper the quality of life and even lead to physiological problems especially with regards to the hearing ability of the users present in the noisy environments.

To this end, one or more distributed active noise cancellation techniques are disclosed for implementing in an environment where noise is generated from multiple sources. The techniques use audio microphones and vibration sensor at each of the noise source (e.g. fans for forced air cooling sources in a data center or a serve room) for capturing the noise and vibration. Additional microphones may be used at various locations in the environment to sense the ambient noise. Further, microphones and vibration sensors may be used at the Heating Ventilation and Air Conditioning (HVAC) equipment vents present in the environment. The techniques use a data processing unit that collects the noise audio data and vibration data from the sources, analyzes the audio data (frequency spectrum, waveform, amplitude, etc.), and creates anti-noise to be emitted through multiple speakers distributed in the environment (some of them positioned near each noise source) to cancel the noise in the environment.

Figure 1:
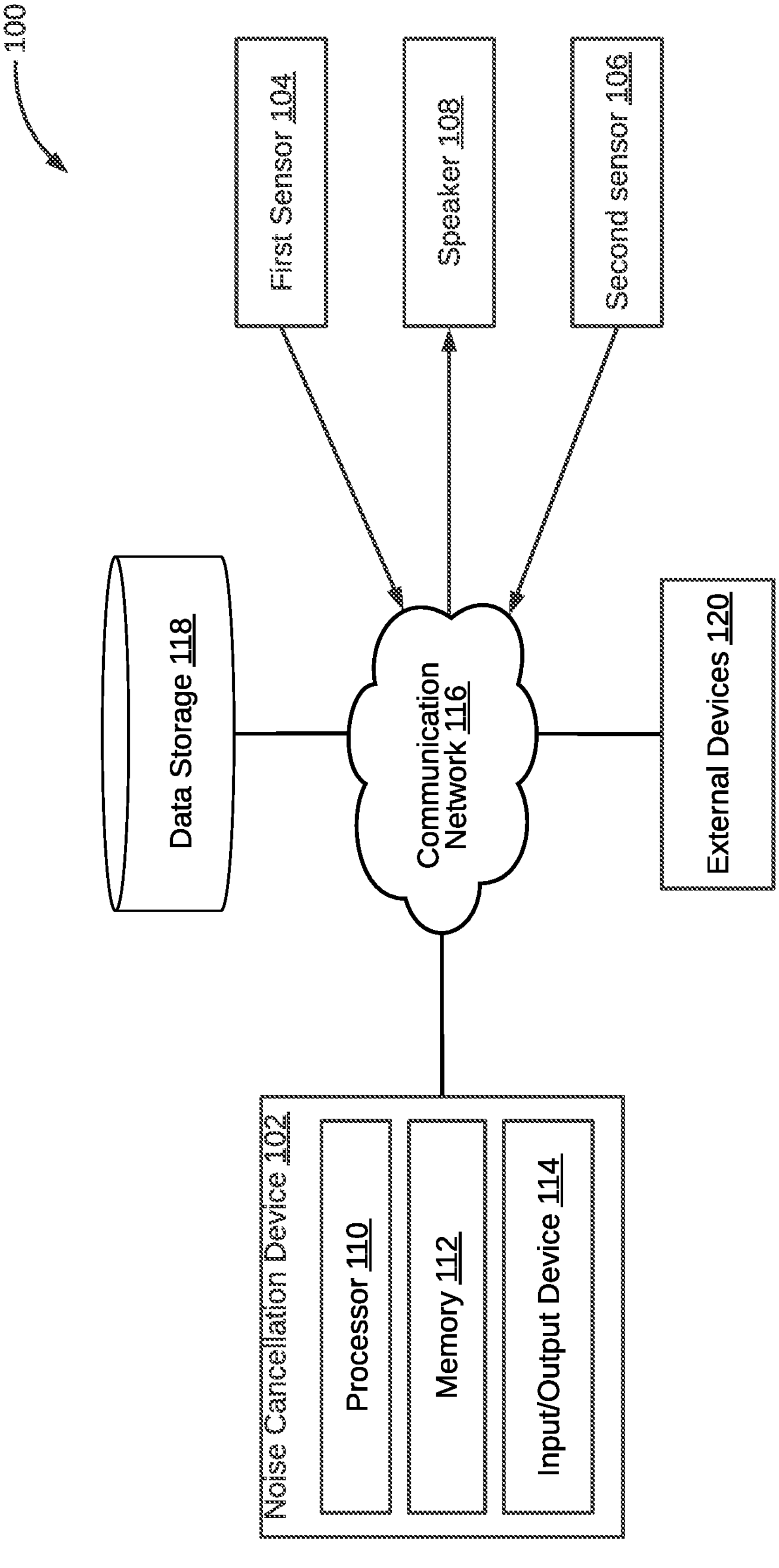
FIG. 1 is a block diagram of a noise cancellation system, in accordance with an embodiment of the present disclosure.

Referring now to FIG. 1, block diagram of a noise cancellation system is illustrated, in accordance with an embodiment of the present disclosure. The system 100 may include a noise cancellation device 102. The noise cancellation device 102 may be a computing device having data processing capability. In particular, the noise cancellation device 102 may have capability for performing noise cancellation. Examples of the noise cancellation device 102 may include, but are not limited to a desktop, a laptop, a notebook, a netbook, a tablet, a smartphone, a mobile phone, an application server, a web server, or the like. The system 100 may further include a data storage 118. For example, the data storage 118 may store various types of data required by the noise cancellation device 102 for performing noise cancellation. The noise cancellation device 102 may be communicatively coupled to the data storage 118 via a communication network 116. The communication network 116 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

The system 100 may further include a first sensor 104, a second sensor 106, and a speaker 108. Each of the first sensor 104 and the second sensor 106 may be a sound sensor (for example, a microphone) or a vibration sensor. The speaker 108 may be any sound generating device capable of generating sound based on a sound signal. The first sensor 104, the second sensor 106, and the speaker 108 may be communicatively coupled with the noise cancellation device 102 over the communication network 116. The system 100 may interact with one or more external devices 120 over the communication network 116 for sending or receiving various data. Examples of the one or more external devices 120 may include, but are not limited to a remote server, a digital device, or another computing system. By way of an example, the system may be installed in a premises with a one or more noise generating sources (e.g. noise generating equipment). For example, the system 100 may be installed in a server room housing a number of computing devices or data storage units which may generate noise.

As will be described in greater detail in conjunction with FIG. 2 to FIG. 7, in order to perform noise cancellation, the noise cancellation device 102 may receive a first signal indicative of a noise generated by a noise generating source, e.g. an equipment (noise generating source may also have been referred to as equipment in this disclosure) from the first sensor 104. The first sensor 104 may be configured to generate the first signal indicative of the noise generated by the equipment. The first sensor 104 may be positioned in proximity to the equipment. The noise cancellation device 102 may further generate a noise cancellation signal based on the first signal. Further, the noise cancellation device 102 may trigger the speaker 108 to generate a sound corresponding to the noise cancellation signal. The speaker 108 may be positioned in proximity to the equipment.

Additionally, the noise cancellation device 102 may receive from the second sensor 106 a second signal indicative of the sound generated by the speaker 108. The second sensor 106 may be positioned in proximity to the speaker 108 and may be configured to detect the sound generated by the speaker 108. In other words, the second sensor may detect the anti-noise sound that is generated by the speaker in order to cancel the noise. The noise cancellation device 102 may further compare the second signal with the first signal and the noise cancellation signal and determine an effectiveness of the sound generated by the speaker 108 for noise cancellation, based on the comparison. The noise cancellation device 102 may further tune the noise cancellation signal based on the comparison.

In order to perform the above-discussed functionalities, the noise cancellation device 102 may include a processor 110 and a memory 112. The memory 112 may store instructions that, when executed by the processor 110, cause the processor 110 to perform noise cancellation, as discussed in greater detail in FIG. 2 to FIG. 7. The memory 112 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited to Dynamic Random Access Memory (DRAM), and Static Random-Access memory (SRAM). The memory 112 may also store various data (e.g. sensor data, comparison data, etc.) that may be captured, processed, and/or required by the system 100.

The noise cancellation device 102 may further include one or more input/output devices 114 through which the noise cancellation device 102 may interact with a user and vice versa. By way of an example, the input/output device 114 may be used to display a degree of effectiveness of the sound generated by the speaker for noise cancellation.

Figure 2:
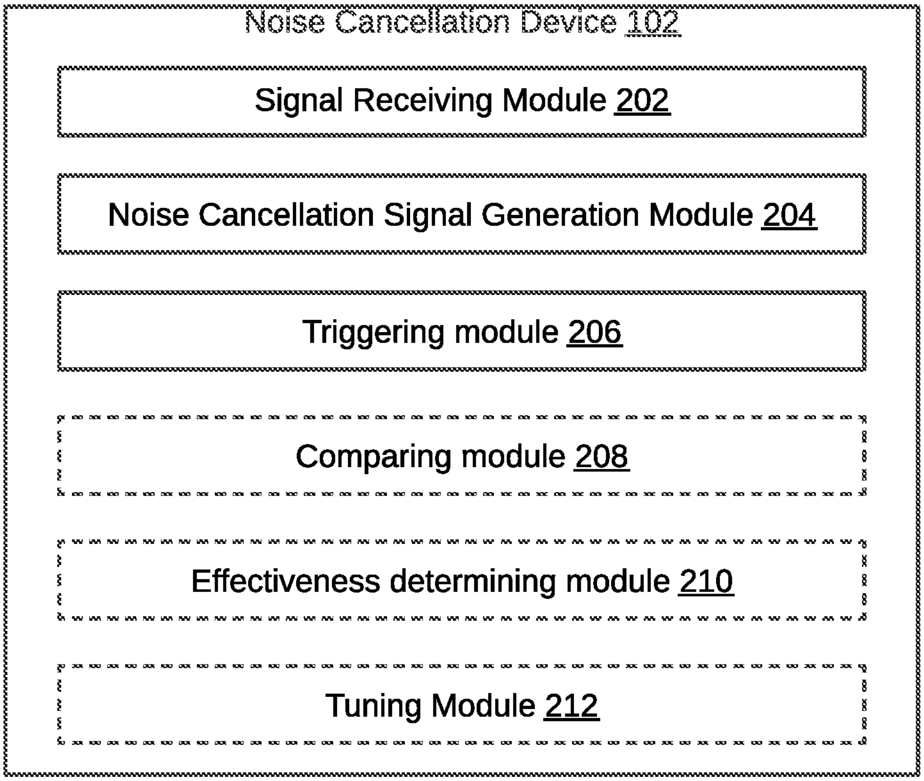
FIG. 2 is a functional block diagram of a noise cancellation device for noise cancellation, in accordance with an embodiment of the present disclosure.

Referring now to FIG. 2, a functional block diagram of the noise cancellation device 102 for noise cancellation is illustrated, in accordance with an embodiment of the present disclosure. In some embodiments, the noise cancellation device 102 may include a signal receiving module 202, a noise cancellation signal generation module 204, a triggering module 206, a comparing module 208, an effectiveness determining module 210, and a tuning module 212.

The signal receiving module 202 may receive from the first sensor 104, a first signal indicative of a noise generated by an equipment. The first sensor 104 may be configured to generate the first signal indicative of the noise generated by the equipment. Further, in some embodiments, the first sensor 104 may be positioned in proximity to the equipment. It should be noted that by way of being positioned in proximity to equipment, the first sensor 104 is able to detect the exact sound (noise) that is generated by the equipment. For example, when the equipment is a cooling device, the first sensor 104 may be positioned close to a fan or air outlet of the cooling device, i.e. at the vent of the cooling device. The noise cancellation signal generation module 204 may generate a noise cancellation signal based on the first signal received by the signal receiving module 202. In other words, the noise cancellation signal generation module 204 may generate an anti-noise signal which is potentially capable of cancelling the sound that is generated by the equipment and detected by the first sensors 104. The triggering module 206 may trigger the speaker 108 to generate a sound corresponding to the noise cancellation signal.

The speaker may therefore generate the anti-noise sound based on the noise cancellation signal received from the noise cancellation signal generation module 204. In some embodiments, the speaker 108 may be positioned in proximity to the equipment. It is worth mentioning that by way of the speaker 108 being positioned in proximity to the equipment, an attempt is made to cancel the noise at the source, for effective noise cancellation.

In some additional embodiments, the signal receiving module 202 may receive a second signal indicative of the sound generated by the speaker 108 from the second sensor 106. To this end, the second sensor 106 may be positioned in proximity to the speaker 108 and therefore may be configured to detect the sound generated by the speaker 108. The comparing module 208 may compare the second signal with the first signal and the noise cancellation signal. In other words, the comparing module 208 may compare the sound generated by the speaker with the (sound of the) noise as well as with the desired anti-sound.

The effectiveness determining module 210 may determine effectiveness of the sound generated by the speaker 108 for noise cancellation based on the comparison. The effectiveness determining module 210 may therefore determine how effectively the sound generated by the speaker 108 is able to cancel the noise generated by the equipment, and further how accurately the speaker is able to generate a sound corresponding to the noise-cancellation signal generated by the noise cancellation signal generation module 204.

The tuning module 212 may tune the noise cancellation signal based on the comparison. In particularly, the tuning module 212 may take the feedback from the second sensor 106 (on how effectively the sound generated by the speaker 108 is able to cancel the noise generated by the equipment, and how accurately the speaker is able to generate a sound corresponding to the noise-cancellation signal). Further, the tuning module 212 may coordinate with the noise cancellation signal generation module 204 to generate a new noise cancellation signal which is tuned based on the feedback. As such, the tuning module 212 incorporate a feedback incorporation functionality to improve the sound cancellation signal.

Figure 3:
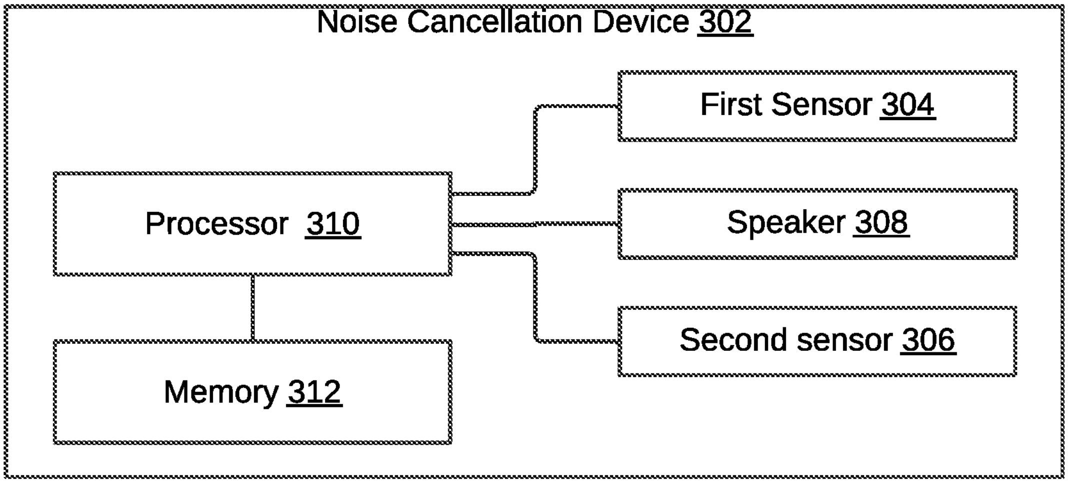
FIG. 3 is a block diagram of a noise cancellation device, in accordance with another embodiment of the present disclosure.

Referring now to FIG. 3, a block diagram of a noise cancellation device 302 is illustrated in accordance with some embodiments of the present disclosure. The noise cancellation device 302 may include a first sensor 304, a second sensor 306, and a speaker 308. As mentioned above, each of the first sensor 304 and the second sensor 306 may be a sound sensor, for example, a microphone, or a vibration sensor, etc. The speaker 308 may be any sound generating device capable of generating sound based on a sound signal. The noise cancellation device 302 may further include a processor 310 and a memory 312. The processor 310 and the memory 312 may be implemented in the same manner as the processor 110 and the memory 112 that are already explained in detail in conjunction with FIG. 1. It should be noted that the noise cancellation device 302 may be implemented as a self-contained unit that may be directly installed in an environment and where noise cancellation is desired to be performed. The environment may include one or more noise generating equipment.

The noise cancellation device 302 can be implemented in noise generating equipment like industrial appliances including cutting, girding, and drilling machines, as well as generator, motors, pumps, etc. The self-contained noise cancellation device 302 can be simply positioned alongside the noise generating equipment, to thereby reduce the effect of the noise generated and improve the overall experience for the human users around such equipment. Further, the noise cancellation device 302 may be implemented with noise generating home appliances like food processors, mixers, grinders, fans, air coolers, HVAC equipment, (electricity) gensets, water pumps, etc.

As already mentioned above, in order to perform noise cancellation, the processor 310 may receive from the first sensor 304 a first signal indicative of a noise generated by the equipment. The first sensor 304 may be positioned in proximity to the equipment. The first sensor 304 may be configured to detect the noise generated by the equipment and generate the first signal indicative of the noise generated by the equipment. The processor 310 may further generate a noise cancellation signal based on the first signal and trigger the speaker 308 to generate a sound corresponding to the noise cancellation signal. For example, the speaker 308 may be positioned in proximity to the equipment.

Additionally in some embodiments, the processor 310 may receive from the second sensor 306 a second signal indicative of the sound generated by the speaker 308. The second sensor 306 may be positioned in proximity to the speaker 308 and may be configured to detect the sound generated by the speaker 308. The processor 310 may further compare the second signal with the first signal and the noise cancellation signal. The processor 310 may further determine an effectiveness of the sound generated by the speaker 308 for noise cancellation based on the comparison. The processor 310 may further tune the noise cancellation signal based on the comparison.

Figure 4:
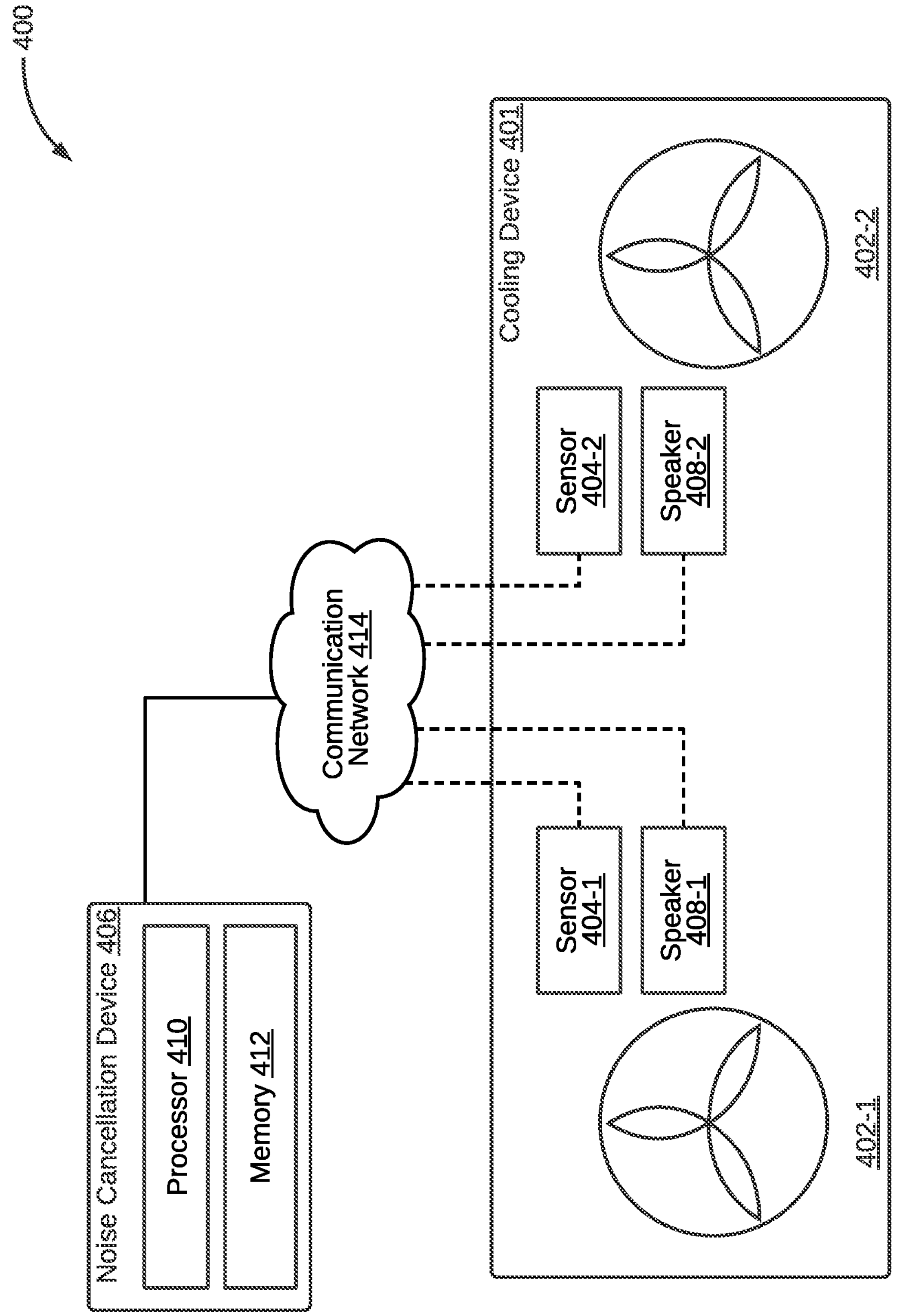
FIG. 4 is a block diagram of a noise cancellation system, in accordance with another embodiment of the present disclosure.

Referring now to FIG. 4, a block diagram of a noise cancellation system 400 is illustrated, in accordance with some embodiments of the present disclosure. The noise cancellation system 400 may be implemented with a noise generating cooling device 401. For example, the cooling device 401 may include one or more cooling components 402-1, 402-2 (the one or more cooling components may have been collectively referred to as cooling components 402) which during operation may generate a sound. (It should be noted that only two cooling components 402-1, 402-2 are illustrated in the FIG. 4 for explanation; however, the noise cancellation system 400 may include any number of cooling components) For example, the cooling component 402 may be a fan. The sound generated by the cooling components 402 may act as noise in an environment in which the cooling device 401 is installed. The one or more cooling components may therefore also be referred to as one or more noise generating sources 402.

The cooling device 401 may include a plurality of sensors 404-1, 404-2 (collectively also referred to as plurality of sensors 404) and a plurality of speakers 408-1, 408-2 (collectively also referred to as plurality of speakers 408). It should be further noted that only two sensors 404-1, 404-2 and only two speakers 408-1, 408-2 are illustrated in the FIG. 4 for the sake of brevity; however, the cooling device 401 may include any number of sensors and speakers. Each of the plurality of sensors 404 may be configured to detect noise generated by one or more noise generating sources 402.

In order to perform the functionality of noise cancelation, the system 400 may further include a noise cancellation device 406. The noise cancellation device 406 may be configured to be communicatively coupled to the plurality of sensors 404 and the plurality of speakers 408 over a communication network 414 (corresponding to the communication network 116). The noise cancellation device 406 may include a processor 410 and a memory 412 (corresponding to the processor 110 and a memory 112, as already explained in conjunction with FIG. 1).

The noise cancellation device 406 may receive a plurality of responses from the plurality of sensors 404, respectively. It should be noted that at least one response of the plurality of responses may include a sensor data item related to the noise. The noise cancellation device 406 may further generate a noise cancellation signal based on the sensor data item related to the noise. Further, the noise cancellation device 406 may trigger the plurality of speakers 408 to generate sound corresponding to the noise cancellation signal.

Additionally, in some embodiments, the plurality of sensors 404 may further detect a sound generated by the plurality of speakers 408. As such, the noise cancellation device 406 may further receive a plurality of responses from the plurality of sensors, respectively. At least one response from the plurality of responses may include a sensor data item related to the sound generated by the plurality of speakers 408. The noise cancellation device 406 may further determine an effectiveness of the sound generated by the plurality of speakers 408 for noise cancellation, based on the sensor data item related to the noise and the sensor data item related to the sound generated by the plurality of speakers 408. In some embodiments, in order to determine the effectiveness, the noise cancellation device 406 may compare the sensor data item related to the noise and the sensor data item related to the sound generated by the plurality of speakers 408. Further, the noise cancellation device 406 may determine the effectiveness of the sound generated by the plurality of speakers for noise cancellation based on the comparison. In some embodiments, the noise cancellation device 406 may further tune the noise cancellation signal based on the effectiveness.

Figure 5A:
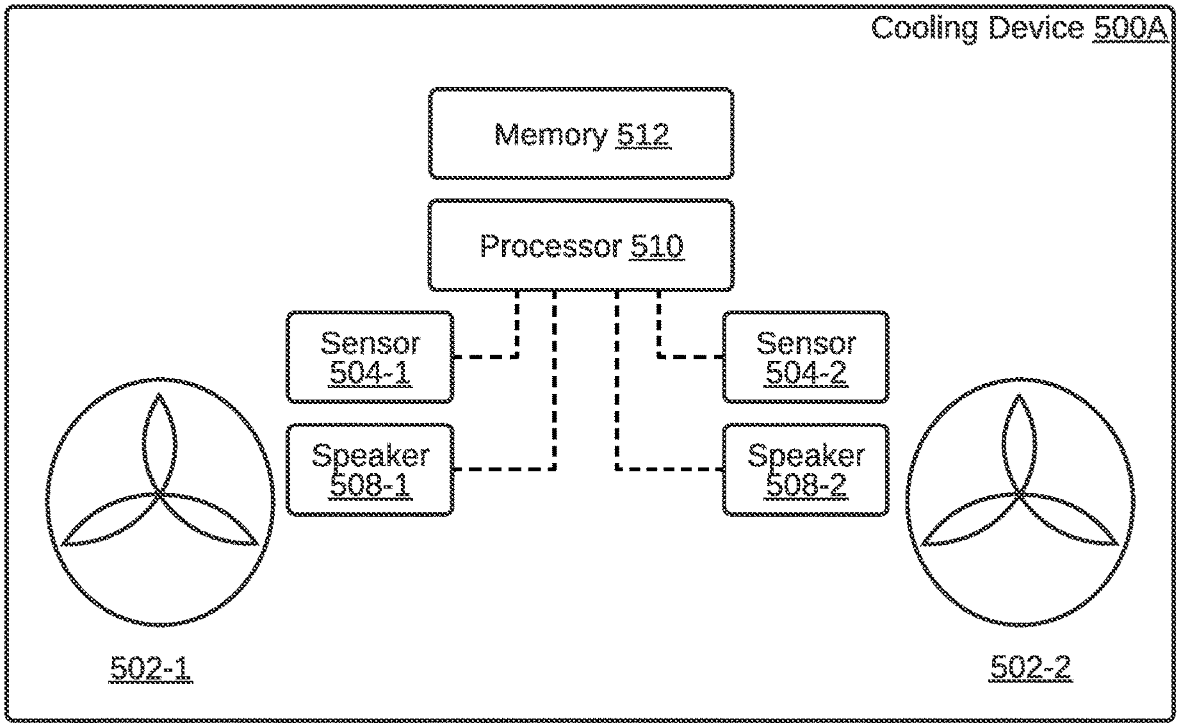
FIG. 5A is a block diagram of a cooling device implementing a noise cancelation functionality, in accordance with an embodiment of the present disclosure.

Referring now to FIG. 5A, a block diagram of a cooling device 500A implementing a noise cancelation functionality is illustrated in accordance with some embodiments of the present disclosure. The cooling device 500A may include one or more cooling components 502-1, 502-2 (the one or more cooling components may also ben collectively referred to as cooling components 502) which during operation may generate a sound. (It should be noted that only two cooling components 502-1, 502-2 are illustrated in the FIG. 5A for explanation; however, the cooling device 500A may include any number of cooling components) For example, the cooling components 502 may include one or more fans. The sound generated by the cooling components 502 may act as noise in an environment in which the cooling device 500A is installed. The one or more cooling components may therefore also be referred to as one or more noise generating sources 502.

In order to perform the functionality of noise cancelation, the cooling device 500A may include a plurality of sensors 504-1, 504-2 (collectively also referred to as plurality of sensors 504), a plurality of speakers 508-1, 508-2 (collectively also referred to as plurality of speakers 508), a processor 510 and a memory 512. (It should be further noted that only two sensors 504-1, 504-2, and only two speakers 508-1, 508-2 are illustrated are illustrated in the FIG. 5 for the sake of brevity; however, the cooling device 500A may include any number of sensors and speakers) Each of the plurality of sensors 504 may be configured to detect noise generated by one or more noise generating sources 502. The processor 510 may be communicatively coupled to the plurality of sensors 504 and the plurality of speakers 508. The processor and memory are already explained in conjunction with FIG. 1.

The processor 510 may receive a plurality of responses from the plurality of sensors 504, respectively. It should be noted that at least one response of the plurality of responses may include a sensor data item related to the noise. The processor 510 may further generate a noise cancellation signal based on the sensor data item related to the noise. Further, the processor 510 may trigger the plurality of speakers 508 to generate sound corresponding to the noise cancellation signal.

Additionally, in some embodiments, the plurality of sensors 504 may further detect a sound generated by the plurality of speakers 508. As such, the processor 510 may further receive a plurality of responses from the plurality of sensors, respectively, wherein at least one response from the plurality of responses comprises a sensor data item related to the sound generated by the plurality of speakers 508. The processor 510 may further determine an effectiveness of the sound generated by the plurality of speakers 508 for noise cancellation, based on the sensor data item related to the noise, and the sensor data item related to the sound generated by the plurality of speakers 508. In some embodiments, in order to determine the effectiveness, the processor 510 may compare the sensor data item related to the noise and the sensor data item related to the sound generated by the plurality of speakers 508. Further, the processor 510 may determine the effectiveness of the sound generated by the plurality of speakers for noise cancellation based on the comparison. In some embodiments, the processor 510 may further tune the noise cancellation signal based on the effectiveness.

Figure 5B:
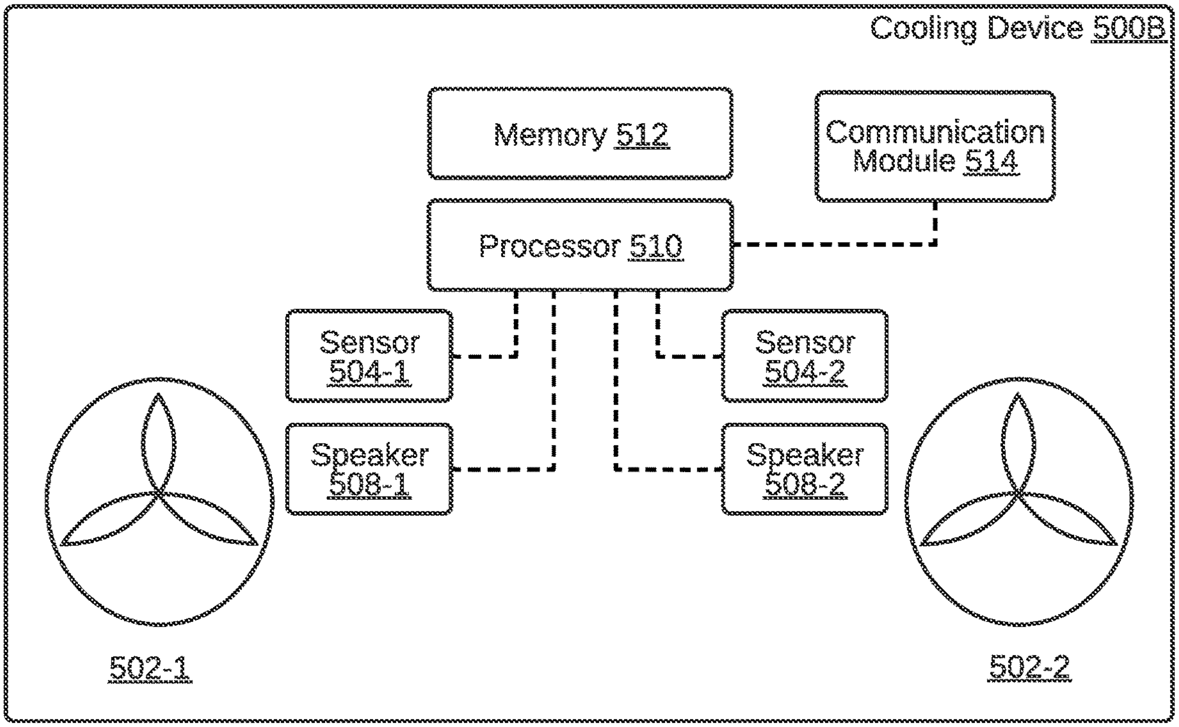
FIG. 5B is a block diagram of a cooling device implementing a noise cancelation functionality and communication functionality, in accordance with an embodiment of the present disclosure.

Referring now to FIG. 5B, a block diagram of a cooling device 500B implementing a noise cancelation functionality and a communication functionality is illustrated in accordance with some embodiments of the present disclosure. The cooling device 500B may share same configuration as of cooling device 500B but with an additional communication module 514. The communication module 514 is communicatively coupled to the processor 510. Further, the communication module 514 may allow the cooling device 500B to be communicatively coupled with an external noise controlling manager, as will be further explained in conjunction with FIG. 6B. The noise controlling manager may be implemented for a space defined by an enclosure where a plurality of cooling devices 500B are implemented. The noise controlling manager may therefore coordinate with each of the plurality of cooling devices 500B to enable a centralized noise cancellation for the enclosure.

Figure 6A:
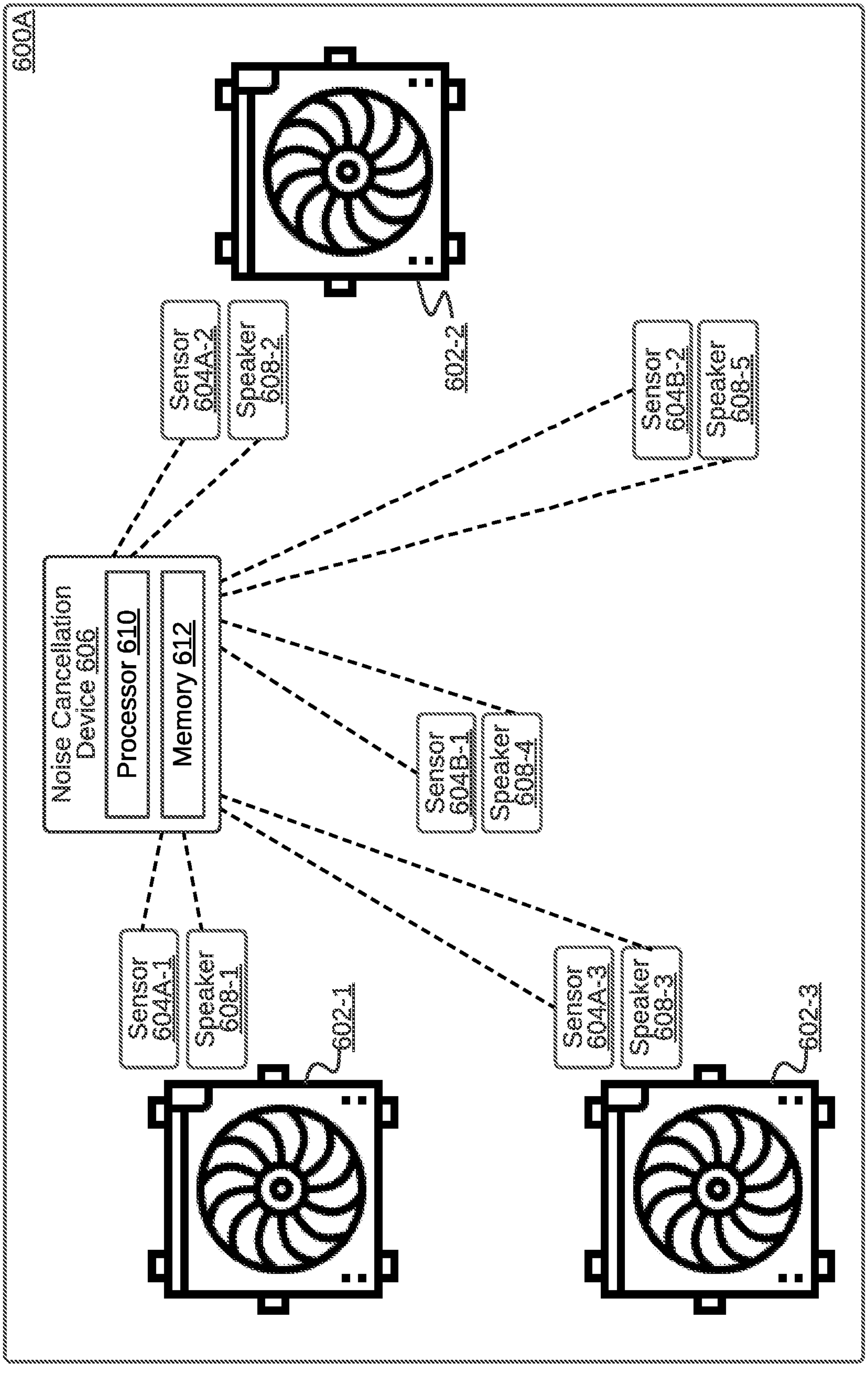
FIG. 6A is a schematic diagram of a noise-cancellation system, in accordance with yet another embodiment of the preset disclosure.

Referring now to FIG. 6A, a schematic diagram of a noise-cancellation system 600A is illustrated, in accordance with some embodiments of the preset disclosure. The noise-cancellation system 600A may be implemented in an environment where a plurality of noise generating sources may be present. For example, the noise-cancellation system 600A may be implemented in a space defined by an enclosure. The enclosure for example, may be a server room, an industrial unit, a section of a residential premises (e.g., a kitchen), etc.

As such, the environment where the noise-cancellation system 600A is implemented may include a plurality of noise generating sources 602-1, 602-2, . . . 602-N (hereinafter, collectively referred to the plurality of noise generating sources 602) which during operation may generate a sound. (It should be noted that only three noise generating sources 602-1, 602-2, 602-3 are illustrated in the FIG. 6A for explanation; however, the environment may include any number of noise generating sources).

In order to perform the functionality of noise cancelation, the noise-cancellation system 600A may include a plurality of sensors 602. The plurality of sensors 604 may include a first set of sensors 604A-1, 604A-2, 604A-3 (collectively also referred to as first set of sensors 604A). Each of the first set of sensors 604A may be positioned in proximity to a noise generating source 602 of the plurality of noise generating sources 602. Further, each of the first set of sensors 604A may be configured to detect noise generated by the associated noise generating source 602. It may be noted that the only three sensors 604A-1, 604A-2, 604A-3 are illustrated in the FIG. 6A as the exemplary embodiment; however, the first set of sensors may include any number of sensors equal to the number of noise generating sources.

The plurality of sensors 604 may further include a second set of sensors 604B-1, 604B-2 (collectively also referred to as second set of sensors 604B). The second set of sensors 604B may be positioned at respective locations distributed in the space defined by the enclosure. Further, each sensor of the second set of sensors 604B may be configured to detect noise at its respective location. In other words, while each of the first set of sensors 604A may be positioned in proximity to the noise generating source 602, the second set of sensors 604B may be positioned relatively away from the noise generating sources 602. For example, the second set of sensors 604B may be positioned at locations where presence of human users is expected, so as to provide quiet surroundings to the human users.

The noise-cancellation system 600A may further include a plurality of speakers 608. The plurality of speakers 608 may include a first set of speakers 608A-1, 608A-2, 608A-3 (collectively also referred to as first set of speakers 608A). Each of the first set of speakers 608A may be positioned in proximity to a noise generating source 602 of the plurality of noise generating sources 602. Further, each of the first set of speakers 608A may be configured to generate a sound corresponding to a noise cancellation signal. Again, it may be noted that the only three speakers 608A-1, 608A-2, 6048-3 are illustrated in the FIG. 6A in the exemplary embodiment; however, the first set of speakers 608A may include any number of speakers equal to the number of noise generating sources.

The plurality of speakers may further include a second set of speakers 608B-1, 608B-2 (collectively also referred to as second set of speakers 608B). The second set of speakers 608B may be positioned at respective locations distributed in a space defined by the enclosure. Further, each speaker of the second set of speakers 604B may be configured to generate a sound corresponding to the noise cancellation signal. In other words, while each of the first set of speakers 608A may be positioned in proximity to the noise generating source 602, the second set of speakers 608B may be positioned relatively away from the noise generating sources 602. For example, the second set of speakers 608B may positioned at locations where presence of human users is expected, so as to provide noise cancellation at that location.

The noise cancellation system 600A may further include a noise cancellation device 606. The noise cancellation device 606 may be communicatively coupled to the plurality of sensors 604 and the plurality of speakers 608 over a communication network. The noise cancellation device 606 may include a processor 610 and a memory 612 (corresponding to the processor 110 and a memory 112, as already explained in conjunction with FIG. 1).

The noise cancellation device 606 may receive a plurality of responses from the plurality of sensors 604, respectively. It should be noted that at least one response of the plurality of responses may include a sensor data item related to the noise. The noise cancellation device 606 may further generate a noise cancellation signal based on the sensor data item related to the noise. Further, the noise cancellation device 606 may trigger the plurality of speakers 608 to generate sound corresponding to the noise cancellation signal.

Additionally, in some embodiments, the plurality of sensors 604 may further detect a sound generated by the plurality of speakers 608. As such, the noise cancellation device 606 may further receive a plurality of responses from the plurality of sensors, respectively. At least one response from the plurality of responses may include a sensor data item related to the sound generated by the plurality of speakers 608. The noise cancellation device 606 may further determine an effectiveness of the sound generated by the plurality of speakers 608 for noise cancellation, based on the sensor data item related to the noise, and the sensor data item related to the sound generated by the plurality of speakers 608. In some embodiments, in order to determine the effectiveness, the noise cancellation device 606 may compare the sensor data item related to the noise and the sensor data item related to the sound generated by the plurality of speakers 608. Further, the noise cancellation device 606 may determine the effectiveness of the sound generated by the plurality of speakers for noise cancellation based on the comparison. In some embodiments, the noise cancellation device 606 may further tune the noise cancellation signal based on the effectiveness.

Figure 6B:
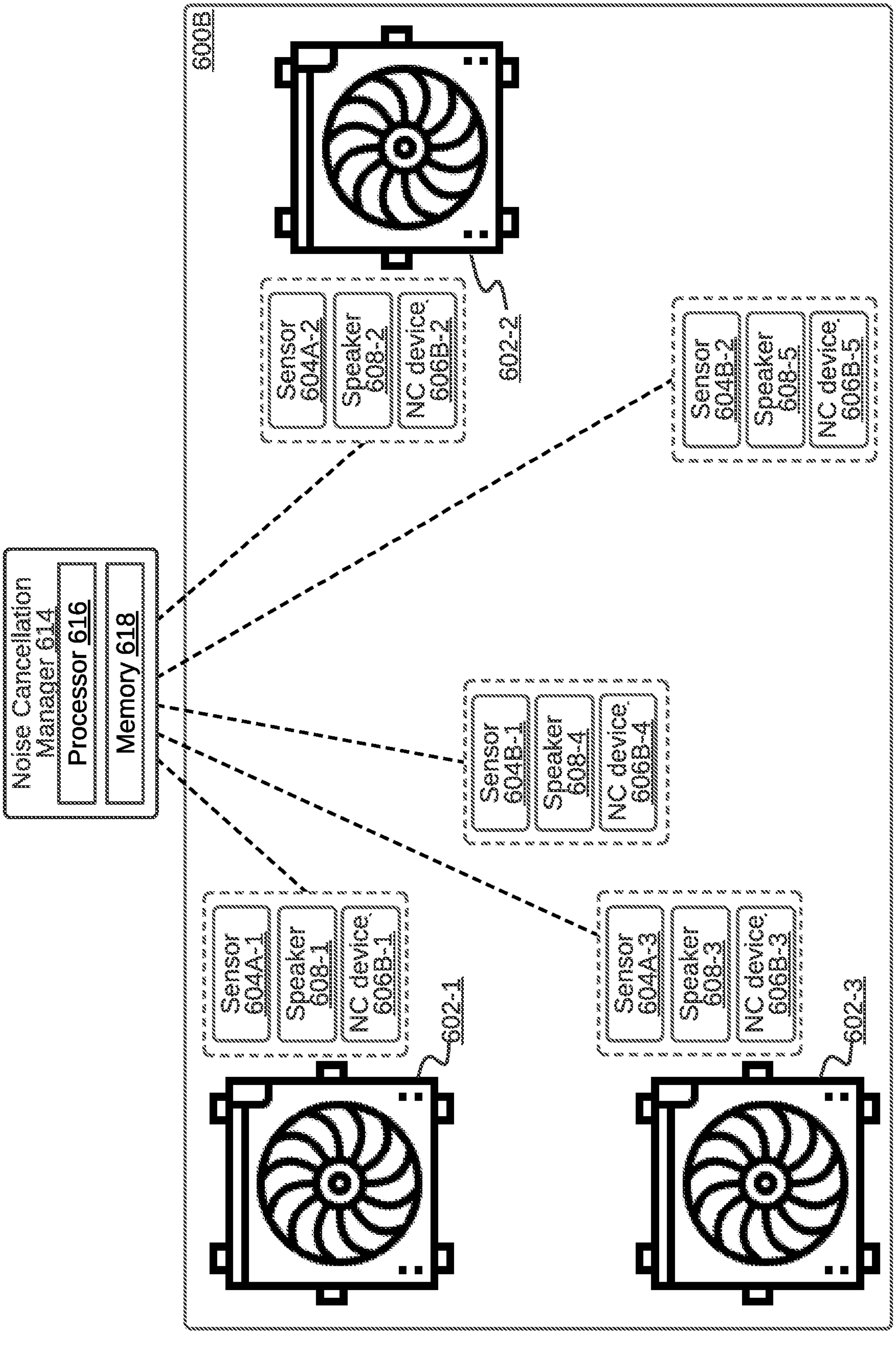
FIG. 6B is a schematic diagram of another noise-cancellation system, in accordance with yet another embodiment of the preset disclosure.

Referring now to FIG. 6B, a schematic diagram of a noise-cancellation system 600B is illustrated, in accordance with some embodiments of the preset disclosure. The noise-cancellation system 600B may be implemented in an environment where a plurality of noise generating sources may be present. As such, similar to the depiction of the noise-cancellation system 600A in FIG. 6A, the environment where the noise-cancellation system 600B is implemented may include the plurality of noise generating sources 602. In order to perform the functionality of noise cancelation, the noise-cancellation system 600B may include the plurality of sensors 602. The plurality of sensors 604 may include a first set of sensors 604A that may be positioned in proximity to a noise generating source 602 of the plurality of noise generating sources 602. Each of the first set of sensors 604A may be configured to detect noise generated by the associated noise generating source 602. The plurality of sensors 604 may further include the second set of sensors 604B that may be positioned at respective locations distributed in the space defined by the enclosure. Further, each sensor of the second set of sensors 604B may be configured to detect noise at its respective location. The noise-cancellation system 600B may further include a plurality of speakers 608. The plurality of speakers 608 may include the first set of speakers 608A that may be positioned in proximity to a noise generating source 602 of the plurality of noise generating sources 602. The plurality of speakers may further include the second set of speakers 608B that may be positioned at respective locations distributed in a space defined by the enclosure.

The noise cancellation system 600B may further include a plurality of noise cancellation (NC) devices 606B-1, 606B-2, . . . 606B-N (hereinafter collectively referred to as plurality of noise cancellation devices 606B). Each of the plurality of noise cancellation devices 606B may be communicatively coupled to an associated sensor and speaker of the plurality of sensors 604 and the plurality of speakers 608, respectively. Each of the plurality of noise cancellation devices 606B may perform the noise cancellation functionality as already discussed in conjunction with FIGS. 2-6B.

The noise cancellation system 600B may further include a noise controlling manager 614. The noise controlling manager 614 may be implemented over a cloud network. Each of the plurality of sensors 604, the plurality of the speakers 608, and the plurality of noise cancellation devices 606B may be communicatively coupled with the noise controlling manager 614. To this end, each of the noise cancellation devices 606B may include a communication functionality (e.g. the communication module 514 as discussed in conjunction with FIG. 5B). The noise controlling manager 614 may include a processor 616 and a memory 618. The noise controlling manager 614 may be implemented for the space defined by the enclosure where a plurality of noise generating sources 602 are implemented. The noise controlling manager 614 may coordinate with each of the plurality of noise generating sources 602 to enable a centralized noise cancellation for the enclosure, in addition to the noise cancellation functionality afforded by the plurality of noise cancellation devices 606B. For example, the noise controlling manager 614 may receive from each of the second set of sensors 604B a noise experienced at their respective locations. It is possible that some noise may still not be cancelled by the use of the plurality of noise cancellation devices 606B since the noise cancellation functionality of the noise cancellation devices 606B may be localized to their respective positions and does not extend to the overall space defined by the enclosure. In such scenarios, the noise controlling manager 614 may coordinate with the plurality of sensors 604, the plurality of the speakers 608, and the plurality of noise cancellation devices 606B, to provide an additional centralized noise cancellation for the enclosure.

Figure 7:
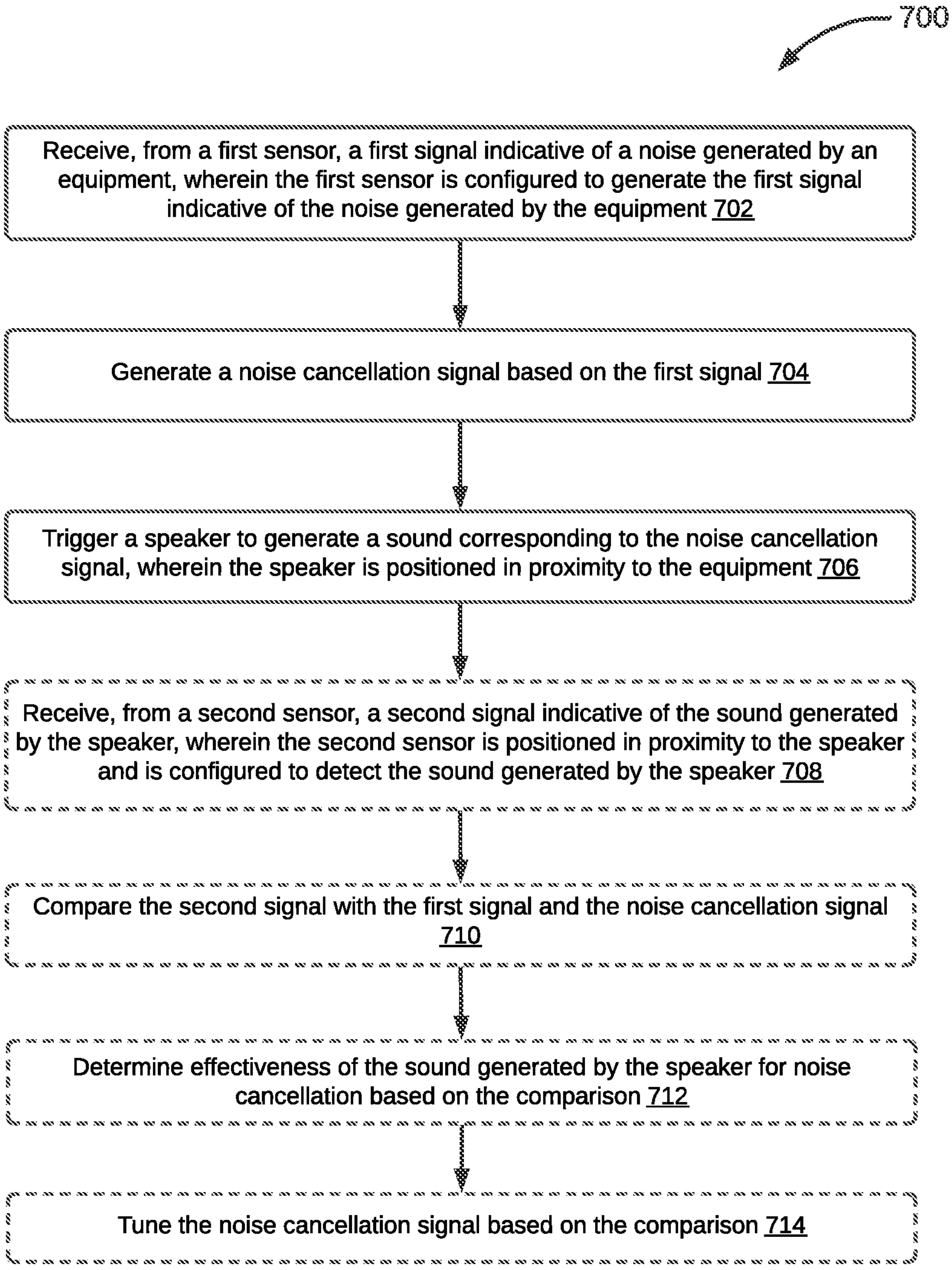
FIG. 7 is a flowchart of a method of noise cancellation, in accordance with an embodiment of the present disclosure.

Referring now to FIG. 7, a flowchart of a method 700 of noise-cancellation is illustrated, in accordance with an embodiment of the present disclosure. By way of an example, the method 700 may be performed by a noise cancellation device 102.

At step 702, a first signal indicative of a noise generated by an equipment may be received from a first sensor 104. The first sensor 104 may be configured to generate the first signal indicative of the noise generated by the equipment. Further, the first sensor 104 may be positioned in proximity to the equipment. At step 704, a noise cancellation signal may be generated based on the first signal. At step 706, a speaker 108 may be triggered to generate a sound corresponding to the noise cancellation signal. The speaker 108 may be positioned in proximity to the equipment.

In some embodiments, additionally, at step 708, a second signal indicative of the sound generated by the speaker 108 may be received from a second sensor 106. The second sensor 106 may be positioned in proximity to the speaker 108 and may be configured to detect the sound generated by the speaker 108. At step 710, the second signal may be compared with the first signal and the noise cancellation signal. At step 710, an effectiveness of the sound generated by the speaker 108 for noise cancellation may be determined based on the comparison. At step 712, the noise cancellation signal may be tuned based on the comparison.

One or more noise cancelation techniques are disclosed above. In some of the embodiments, the above noise cancelation techniques provide for distributed multi-node active noise cancellation for noisy enclosures like data centers and manufacturing and engineering units that use forced air cooling (via fans). The above techniques are useful in the environments where multiple distributed noise sources are present. Further, the above noise cancellation techniques allow for cost-effective and smaller size data center constructions, as the requirements for sound proofing is reduced. Moreover, by implementing the above noise cancellation techniques, experience for human occupants inside the enclosures is improved by maintaining tolerable audio volume levels. Furthermore, adverse effect on the health and safety of the human occupants due to the noisy environment can be avoided.

It is intended that the disclosure and examples be considered as exemplary only, with a true scope and spirit of disclosed embodiments being indicated by the following claims

What is claimed is:

1. A noise-cancellation system comprising:
a first sensor positioned in proximity to an equipment, wherein the first sensor is configured to:
detect noise generated by the equipment; and
generate a first signal indicative of the noise generated by the equipment;
a speaker positioned in proximity to the equipment;
a processor communicatively coupled to the first sensor and the speaker; and
a memory communicatively coupled to the processor, wherein the memory stores processor-executable instructions which, on execution by the processor, cause the processor to:
receive, from the first sensor, the first signal;
generate a noise cancellation signal based on the first signal; and
trigger the speaker to generate a sound corresponding to the noise cancellation signal, wherein the first sensor and the speaker are placed in proximity to the equipment to cancel the noise at a noise generation source.

2. The system of claim 1 further comprising:
a second sensor positioned in proximity to the speaker and communicatively coupled to the processor, wherein the second sensor is configured to:
detect the sound generated by the speaker; and
generate a second signal indicative of the sound generated by the speaker.

3. The system of claim 2, wherein the processor-executable instructions, on execution by the processor, further cause the processor to:
receive, from the second sensor, the second signal in response to the sound generated by the speaker; and
determine an effectiveness of the sound generated by the speaker for noise cancellation, based on the second signal.

4. The system of claim 3, wherein determining the effectiveness comprises:
comparing the second signal with the first signal and the noise cancellation signal; and
determining the effectiveness of the sound generated by the speaker for noise cancellation based on the comparison.

5. The system of claim 4, wherein the processor-executable instructions, on execution by the processor, further cause the processor to:
tune the noise cancellation signal based on the comparison.

6. A noise cancellation system comprising:
a cooling device comprising:
a plurality of sensors configured to detect noise generated by one or more noise generating sources; and
a plurality of speakers; and
a noise cancellation device communicatively coupled to the plurality of sensors and the plurality of speakers, the noise cancellation device comprising:
a processor; and
a memory communicatively coupled to the processor, wherein the memory stores processor-executable instructions which, on execution by the processor, cause the processor to:
receive a plurality of responses from the plurality of sensors, respectively, wherein at least one response of the plurality of responses comprises a sensor data item related to the noise;
generate a noise cancellation signal based on the sensor data item related to the noise; and
trigger the plurality of speakers to generate sound corresponding to the noise cancellation signal, wherein the plurality of sensors and the plurality of speaker are placed in proximity to the equipment to cancel the noise at a noise generation source.

7. The cooling device of claim 6, wherein the plurality of sensors is further configured to:
detect a sound generated by the plurality of speakers.

8. The cooling device of claim 7, wherein the processor-executable instructions, on execution by the processor, further cause the processor to:
receive a plurality of responses from the plurality of sensors, respectively,
wherein at least one response from the plurality of responses comprises a sensor data item related to the sound generated by the plurality of speakers;
determine an effectiveness of the sound generated by the plurality of speakers for noise cancellation, based on the sensor data item related to the noise, and the sensor data item related to the sound generated by the plurality of speakers, wherein determining the effectiveness comprises:
comparing the sensor data item related to the noise and the sensor data item related to the sound generated by the plurality of speakers; and
determining the effectiveness of the sound generated by the plurality of speakers for noise cancellation based on the comparison; and
tuning the noise cancellation signal based on the effectiveness.

9. A method of noise-cancellation comprising:
receiving, from a first sensor, a first signal indicative of a noise generated by an equipment, wherein the first sensor is configured to generate the first signal indicative of the noise generated by the equipment, wherein the first sensor is positioned in proximity to the equipment;
generating a noise cancellation signal based on the first signal; and
triggering a speaker to generate a sound corresponding to the noise cancellation signal, wherein the speaker is positioned in proximity to the equipment, wherein the first sensor and the speaker are placed in proximity to the equipment to cancel the noise at a noise generation source.

10. The method of claim 9 further comprises:
receiving, from a second sensor, a second signal indicative of the sound generated by the speaker, wherein the second sensor is positioned in proximity to the speaker and is configured to detect the sound generated by the speaker;
comparing the second signal with the first signal and the noise cancellation signal;
determining effectiveness of the sound generated by the speaker for noise cancellation based on the comparison; and tuning the noise cancellation signal based on the comparison.

11. A cooling device comprising:

a plurality of sensors positioned in proximity to an equipment, wherein the plurality of sensors is configured to:

detect noise generated by the equipment;

a plurality of speakers positioned in proximity to the equipment;

a processor communicatively coupled to the plurality of sensors and the plurality of speakers; and a memory communicatively coupled to the processor, wherein the memory stores processor-executable instructions which, on execution by the processor, cause the processor to:

receive a plurality of responses from the plurality of sensors, respectively, wherein at least one response of the plurality of responses comprises a sensor data item related to the noise;

generate a noise cancellation signal based on the sensor data item related to the noise; and trigger the plurality of speakers to generate a sound corresponding to the noise cancellation signal, wherein the plurality of sensors and the plurality of speaker are placed in proximity to the equipment to cancel the noise at a noise generation source.

12. The cooling device of claim 11, wherein the plurality of sensors is further configured to:

detect the sound generated by the plurality of speakers.

13. The cooling device of claim 12, wherein the processor-executable instructions, on execution by the processor, further cause the processor to:

receive the plurality of responses from the plurality of sensors, respectively, wherein at least one response of the plurality of responses comprises a sensor data item related to the sound generated by the plurality of speakers; and determine effectiveness of the sound generated by the plurality of speakers for noise cancellation, based on the plurality of signals, wherein determining the effectiveness comprises:

comparing the sensor data item related to the noise with the data item related to the sound generated by the plurality of speakers;

determining the effectiveness of the sound generated by the plurality of speakers for noise cancellation based on the comparison; and tuning the noise cancellation signal based on the effectiveness.

14. A noise-cancellation system comprising:

a plurality of sensors comprising:

a first set of sensors positioned in proximity to an equipment, wherein the first set of sensors is configured to detect noise generated by the equipment; and a second set of sensors positioned at respective locations distributed in a space defined by an enclosure, wherein each sensor of the second set of sensors is configured to detect noise at its respective location;

a plurality of speakers comprising:

a first set of speakers positioned in proximity to the equipment; and a second set of speakers positioned at respective locations distributed in the space defined by the enclosure;

a processor communicatively coupled to the plurality of sensors and the plurality of speakers; and a memory communicatively coupled to the processor, wherein the memory stores processor-executable instructions which, on execution by the processor, cause the processor to:

receive a plurality of responses from the plurality of sensors, respectively, wherein at least one response of the plurality of responses comprises a sensor data item related to the noise;

generate a noise cancellation signal based on the sensor data item related to the noise; and trigger the plurality of speakers to generate a sound corresponding to the noise cancellation signal, based on the respective location of each of the plurality of speakers, wherein the first set of sensors and the first set of speakers are placed in proximity to the equipment to cancel the noise at a noise generation source.

15. The noise-cancellation system of claim 14, wherein the plurality of sensors is further configured to:

detect the sound generated by the plurality of speakers; and wherein the processor-executable instructions, on execution by the processor, further cause the processor to:

receive the plurality of responses from the plurality of sensors, respectively, wherein at least one response of the plurality of responses comprises a sensor data item related to the sound generated by the plurality of speakers;

determine effectiveness of the sound generated by the plurality of speakers for noise cancellation, wherein determining the effectiveness comprises:

comparing the sensor data item related to the noise with the data item related to the sound generated by the plurality of speakers; and determining the effectiveness of the sound generated by the plurality of speakers for noise cancellation based on the comparison; and tune the noise cancellation signal based on the effectiveness.

* * * * *